(12) United States Patent
Cover

(10) Patent No.: US 7,264,298 B2
(45) Date of Patent: Sep. 4, 2007

(54) SEAT UNIT FOR A SMALL-SIZED VEHICLE

(75) Inventor: Steven Cover, Newnan, GA (US)

(73) Assignee: Yamaha Motor Mfg. Corp. of America, Newnan, GA (US)

( * ) Notice: Subject to any disclaimer, the term of this patent is extended or adjusted under 35 U.S.C. 154(b) by 27 days.

(21) Appl. No.: 11/119,150

(22) Filed: Apr. 29, 2005

(65) Prior Publication Data
US 2006/0244281 A1 Nov. 2, 2006

(51) Int. Cl.
B62D 25/06 (2006.01)
(52) U.S. Cl. ..................................... 296/102
(58) Field of Classification Search ............ 297/452.59
See application file for complete search history.

(56) References Cited
U.S. PATENT DOCUMENTS 2,673,600 A * 3/1954 Cramer .................. 297/452.59
4,390,210 A * 6/1983 Wisniewski et al. ... 297/452.59
5,031,713 A * 7/1991 Criscuolo .................. 180/89.1
5,048,894 A * 9/1991 Miyajima et al. ...... 297/452.11
6,220,657 B1 * 4/2001 Rea ........................ 296/220.01
2005/0017537 A1 * 1/2005 Held ........................... 296/102

FOREIGN PATENT DOCUMENTS

JP 2002-143359 5/2002

* cited by examiner

Primary Examiner—Dennis H. Pedder
(74) Attorney, Agent, or Firm—Keating & Bennett, LLP

(57) ABSTRACT

A seat unit for a small-sized vehicle improves an appearance of a rear surface of a seat back and includes a bottom plate, a cushioning body disposed on a front surface of the bottom plate, an outer layer member which covers the cushioning body and has an outer periphery that is fixed to the bottom plate, and a cover plate fixed to an outer periphery of the bottom plate and covering a portion of the outer layer member which is fixed to the bottom plate.

5 Claims, 15 Drawing Sheets

Fig.7

SEAT UNIT FOR A SMALL-SIZED VEHICLE

BACKGROUND OF THE INVENTION

1. Field of the Invention

The present invention relates to, for example, a small-sized vehicle such as a passenger golf car, and more specifically, to a seat unit mounted on a vehicle body frame.

2. Description of the Related Art

As a four-wheel golf car of this kind, there is suggested, for example in Japanese Patent Application Laid-open No. 2002-143359, a golf car in which a steering wheel and a driving wheel are respectively disposed on a front portion and a rear portion of a vehicle body frame, two rows of front and rear seat units are disposed in a middle portion of the vehicle body frame, and a bag carrier for mounting a golf bag is disposed behind a seat back of the rear seat unit.

In the above-described seat unit, the seat back is supported by support posts connected to the vehicle body frame. Therefore, a rear surface of the seat back is exposed to the rear of the vehicle. Consequently, since the rear surface of the seat back is seen whenever a golf club is put in/taken out from the bag carrier, there is a concern about the unattractive appearance of the golf car depending on a structure of the rear surface portion of the seat back.

SUMMARY OF THE INVENTION

In order to overcome the problems described above, preferred embodiments of the present invention provide a seat unit for a small-sized vehicle that is capable of improving an appearance of a rear surface of a seat back.

A preferred embodiment of the present invention provides a seat unit for a small-sized vehicle which includes a seat cushion mounted on a vehicle body frame and a seat back arranged to extend upwardly from a rear edge of the seat cushion, wherein the seat back includes a bottom plate, a cushioning body disposed on a front surface of the bottom plate, an outer layer member which covers the cushioning body and has an outer periphery which is fixed to the bottom plate, and a cover plate which is fixed to an outer periphery of the bottom plate and covers a portion of the outer layer member which is fixed to the bottom plate.

According to preferred embodiments of the present invention, since the portion of the outer layer member which is fixed to the bottom plate is covered by the cover plate, an unattractive appearance of the rear surface of the seat back can be reliably prevented. Further, by adding a shape, color, design, logo or the like to enhance the design effect to the cover plate, an appearance thereof is greatly improved.

According to a preferred embodiment of the present invention, the rear surface of the cover plate of the seat back is fixed to a bar-shaped support post for holding the seat back which extends in a vertical direction, and to the support post for holding the seat back, a support post for holding a roof which extends in the vertical direction is fixed.

In this preferred embodiment, the support post for holding the roof can be supported by using the support post for holding the seat back, and the structure thereof is simpler compared with a case in which the support post for holding the roof, in addition to the support post for holding the seat back, is directly fixed to the vehicle body frame, so that a component cost and an assembly cost can be reduced.

According to another preferred embodiment of the present invention, a pair of ribs extending in the vertical direction are provided on the rear surface of the cover plate of the seat back, and the support post for holding the seat back and the support post for holding the roof are disposed substantially in parallel between the both ribs.

In this preferred embodiment, since the support post for holding the seat back and the support post for holding the roof are disposed between the pair of ribs disposed on the rear surface of the cover plate, the seat back can be easily and securely positioned in the vehicle width direction and the longitudinal direction, so that the seat back and the support post for holding the roof can be accurately and easily mounted.

According to yet another preferred embodiment of the present invention, left and right second support posts joined and fixed to the vehicle body frame are provided behind the left and right support posts for holding the seat back, the left support posts are joined to each other and the right support posts are joined to each other by longitudinal members so as to define a left support post member and a right support post member, respectively, and the left support post member and the right support post member are joined by a transverse member.

In this preferred embodiment, since the left and right support posts for holding the seat back and the left and right second support posts are joined by the longitudinal members to define the left support post member and the right support post member, respectively, and the left support post member and the right support post member are joined by the transverse member, a stiffness of the support post for holding the seat back is greatly increased, so that the supporting stiffness of the seat back and the supporting stiffness of the support post for holding the roof can be are significantly improved.

According to yet another preferred embodiment of the present invention, a storage area which is open upward is defined by left and right side walls extending from left and right longitudinal members, a rear wall extending from the transverse member, a bottom wall provided at lower end portions of the rear wall and the side walls, and the cover plate of the seat back.

In this preferred embodiment, the storage area can be defined by effectively using an empty space behind the seat back and the members for enhancing the supporting stiffness of the seat back.

According to yet another preferred embodiment of the present invention, a recess portion arranged to be recessed in a forward direction is formed on a portion of the cover plate which corresponds to the storage area.

In this preferred embodiment, a storage volume capacity of the storage area can be increased by effectively using a thickness of the seat back.

The structure and the operation, along with the elements, characteristics, advantages and effects of the present invention will be described in detail with reference to preferred embodiments based on the following attached drawings.

BRIEF DESCRIPTION OF THE DRAWINGS

FIG. 7 is a cross-sectional side view of the seat unit;

DETAILED DESCRIPTION OF THE PREFERRED EMBODIMENTS

Figure 1:
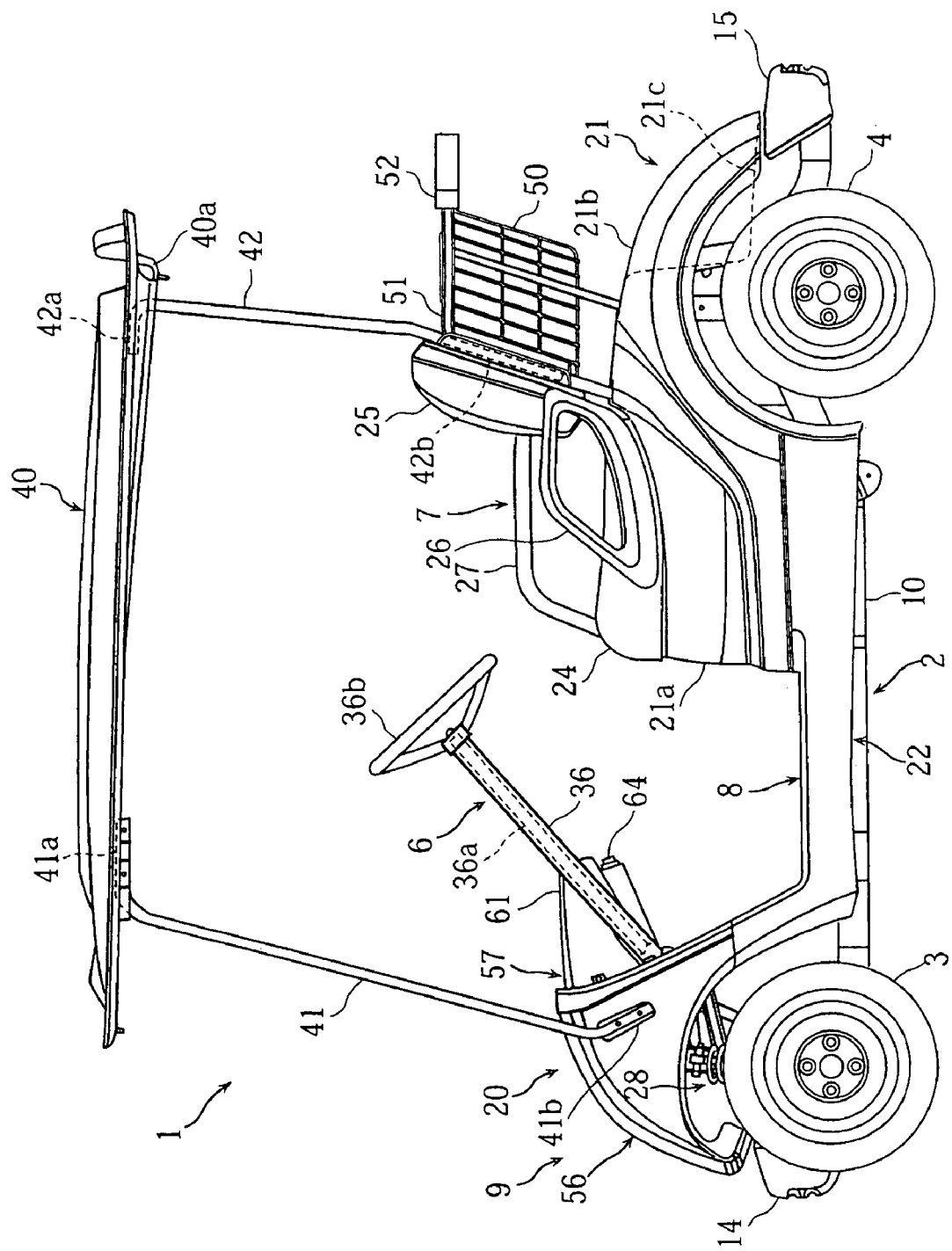
FIG. 1 is a left side view of a passenger golf car (small-sized vehicle) including a seat unit according to a preferred embodiment of the present invention.
Figure 2:
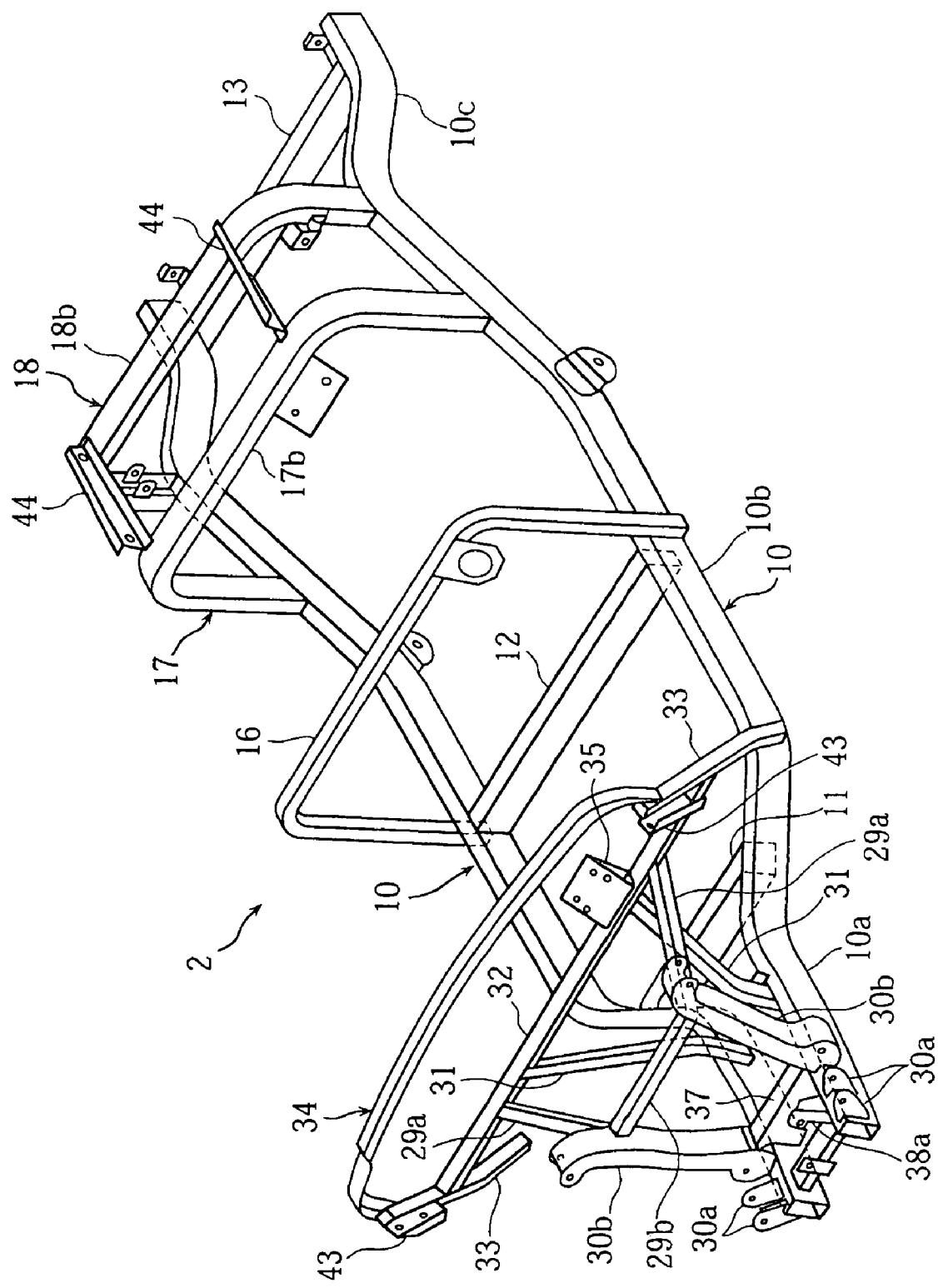
FIG. 2 is a perspective view of a vehicle body frame of the golf car.

Hereinafter, preferred embodiments of the present invention will be described based on the attached drawings. FIG. 1 to FIG. 17 are views for describing a seat unit for a passenger golf car (small-sized vehicle) according to preferred embodiments of the present invention. Note that the indications of front, rear, left and right in the description of the preferred embodiments represents the front, rear, left and right when viewed from the position of an occupant sitting on a seat in the passenger golf car.

In the drawings, "1" denotes a passenger golf car preferably for use, for example, on a golf course. This golf car 1 includes a vehicle body frame 2 constituting a skeletal structure thereof, left and right front wheels 3 disposed at left and right front end portions of the vehicle body frame 2, left and right rear wheels 4 disposed at left and right rear end portions, a steering system 6 disposed between the left and right front wheels 3, a seat unit 7 disposed behind the steering system 6, a power unit 5 disposed below the seat unit 7, a floor panel 8 disposed above the vehicle body frame 2 between the front and rear wheels 3, 4, a roof 40 covering an area above a passenger compartment, and a vehicle body cover 9 enclosing the periphery of the vehicle body.

The vehicle body frame 2 includes left and right main frames 10 disposed on left and right sides of the vehicle and extending in a longitudinal direction, and front, middle, and rear cross pipes 11, 12, 13 which join front portions, middle portions, and rear portions, respectively to each other, of the left and right main frames 10. The left and right main frames 10 and the respective cross pipes 11, 12, and 13 are constituted of longitudinally extending square pipes. Additionally, on a front end and a rear end of the vehicle body frame 2, a front bumper 14 and a rear bumper 15 are mounted, respectively.

Front portions 10a of the left and right main frames 10, in a plan view from above, are bent to deviate inward in the vehicle width direction relative to middle portions 10b and rear portions 10c thereof. Thus, the front portions 10a have a narrower width than the middle portions 10b and rear portions 10c. In a side view shown in FIG. 3, the front portions 10a of the left and right main frames 10 are slightly raised upward, while the rear portions 10c are bent and formed to curve upward.

On the front portions 10a of the left and right main frames 10, there are provided front and rear suspension brackets 30a, 30b, and to the front and rear suspension brackets 30a, 30b, there is joined a front suspension system 28 (see FIG. 1) supporting left and right front wheels 3 in a vertically swingable manner.

Behind the left and right rear suspension brackets 30b, support posts 31 are arranged to rise up from the front portions 10a of the main frames 10. To upper ends of the left and right support posts 31, there is connected a crossbeam member 32 extending in the vehicle width direction. Left and right end portions of this crossbeam member 32 and the left and right rear suspension brackets 30b are joined by left and right reinforcing members 29a, while the left and right rear suspension brackets 30b are joined to each other by a reinforcing member 29b. The two reinforcing members 29a, the reinforcing member 29b and the crossbeam member 32 form a substantial trapezoid in a plan view.

To the left and right end surfaces of the crossbeam member 32, there are connected central portions along a longitudinal direction of the front pipes 33 whose upper portions are slightly shifted obliquely forward as viewed from the side of the vehicle. When viewed from the side of the vehicle as in FIG. 3, a substantial triangle is formed by the mainframe 10, the support post 31 and a later-described floor member fixed to the front pipe 33. Upper end portions of the left and right front pipes 33 are connected to a dashboard support member 34 extending in the vehicle width direction.

At a left side portion along the vehicle width direction of the crossbeam member 32, there is connected a steering support bracket 35, and a steering column 36 of the steering system 6 is supported on the support bracket 35. This steering column 36 extends obliquely upward and rearward to the passenger compartment, and inside the steering column 36, a steering shaft 36a is rotatably supported. To an upper end of this steering shaft 36a, a steering wheel 36b is fixed, while to a lower end, the left and right front wheels 3 are joined via a not shown gear box and tie rod. This gear box is fixed to a gear box bracket 37 connected between the left and right front portions 10a.

A seat cross frame 16 is connected to the middle portions 10b of the left and right main frames 10, while a front/rear pair of front-side and rear-side rear cross frames 17, 18 are respectively connected to the rear portions 10c. The seat cross frame 16 and the front-side and rear-side rear cross frames 17, 18 preferably have Π shapes rising upward from the main frames 10.

The power unit 5 is an integral combination of an electric motor 5a whose power source is a battery unit, and a reduction gear 5b. The electric motor 5a and the reduction gear 5b are arranged between vertical side portions of the rear-side rear cross frame 18 and between the left and right main frames 10, an output shaft 5c of the electric motor 5a is joined to a rear wheel shaft of a rear wheel shaft unit 4a via the reduction gear 5b, a housing of the reduction gear 5b is joined and fixed to a housing of the rear wheel shaft unit 4a, and the rear wheel 4 is joined to an end of the rear wheel shaft. Incidentally, as a matter of course, a gasoline engine can be adopted instead of the electric motor.

Figure 5:
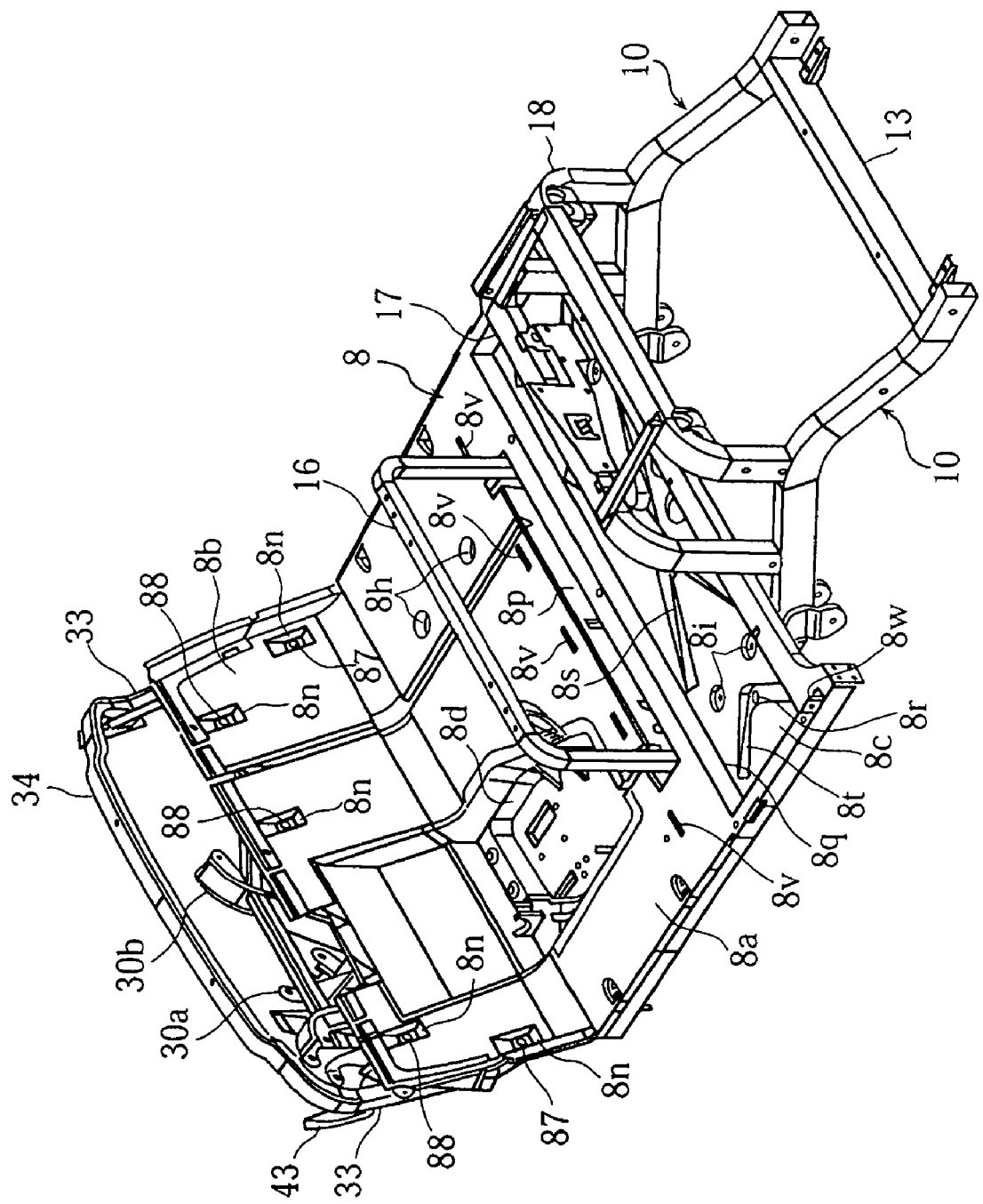
FIG. 5 is a perspective view of a floor panel of the vehicle body frame.

The floor panel 8 has a structure in which, as shown in FIG. 5, mainly, a foot panel portion 8a for the occupant sitting on the seat unit 7 to place feet, a front panel portion 8b that extends continuously from a front end of the foot panel portion 8a so as to rise obliquely upward, and a battery mounting portion 8c extending continuously from a rear end of the foot panel portion 8a so as to extend rearward, are integrally formed, preferably of resin.

A vehicle width dimension of the floor panel 8 is preferably larger than a vehicle width dimension of the left and right main frames 10. As a result, left and right side portions of the floor panel 8 protrude from the left and right main frames 10 toward the outside in the vehicle width direction.

To portions of the foot panel portion 8*a* which face the left and right main frames 10, front/rear pairs of attachment seats 8*h* are provided preferably in the form of a recess or hole. Additionally, to portions of the battery mounting portion 8*c* which face the left and right main frames 10, front/rear pairs of attachment seats 8*i* are provided preferably in the form of a recess or hole. The respective attachment seats 8*h*, 8*i* are bolted and fixed to the left and right main frames 10.

Further, on left and right end portions and upper rim portion of the front panel portion 8*b*, a plurality of attachment seats 8*n* are arranged in the form of forward-extending recesses at predetermined intervals, respectively. The left and right attachment seats 8*n* are fastened and fixed to the left and right front pipes 33 by bolts 87, for example. Also, the respective attachment seats 8*n* of the upper rim portion are fastened and fixed to the crossbeam member 32 by bolts 88, for example.

On a driver's seat side of the foot panel portion 8*a*, a recess portion 8*d* is arranged to recess downward. Inside this recess portion 8*d*, a not-shown accelerator pedal and brake pedal are accommodated.

In the boundary portion between the foot panel portion 8*a* and the battery mounting portion 8*c*, there is formed an opening 8*p* to which the seat cross fame 16 is inserted. Behind the opening 8*p* of the battery mounting portion 8*c*, a battery mounting recess portion 8*q* is arranged to recess downward. Inside the battery mounting recess portion 8*q*, a plurality (e.g., six) of sets of batteries (not shown) are arranged substantially in parallel in the vehicle width direction. The battery mounting recess portion 8*q* is located below a seat cushion 24 which will be described later, and is covered by a rear cover 21.

On a bottom wall portion of the battery mounting recess portion 8*q*, there is formed a weep hole 8*r* which opens downward to the outside. Additionally, on the bottom wall portion, there are respectively formed guide trenches 8*s*, 8*t* whose trench depths are set to become lower as the trenches 8*s*, 8*t* become closer to the weep hole 8*r*.

The roof 40 is disposed above the vehicle body frame 2 (see FIG. 1). The roof 40 preferably has a substantially rectangular shape covering above a front cover 20, the floor panel 8 and the seat unit 7. At left and right rear end portions of this roof 40, there are formed drain holes 40*a* to discharge rainwater and the like pooled on an upper surface of the roof 40 to the outer side behind the seat unit 7.

Left and right front end portions of the roof 40 are connected to upper end portions 41*a* of front roof pillars 41 extending in the vertical direction, while left and right rear end portions are connected to upper end portions 42*a* of rear roof pillars (support post for holding the roof) 42 extending in the vertical direction as well.

Lower end portions 41*b* of the left and right front roof pillars 41 are connected and fixed to left and right front roof brackets 43 joined to the left and right front pipes 33. Lower end portions 42*b* of the left and right rear roof pillars 42 are connected and fixed to seat back supporting members 51 together with a later-described seat back 25.

The seat unit 7 is mounted between the seat cross frame 16 and front-side rear cross frame 17. This seat unit 7 preferably includes the two-seater bench-type seat cushion 24, and the seat back 25 for common use by two persons, which is disposed in such a manner to extend upwardly from a rear edge of the seat cushion 24. The left side and the right side of this seat cushion 24 are a driver's seat and a passenger seat, respectively.

Figure 7:
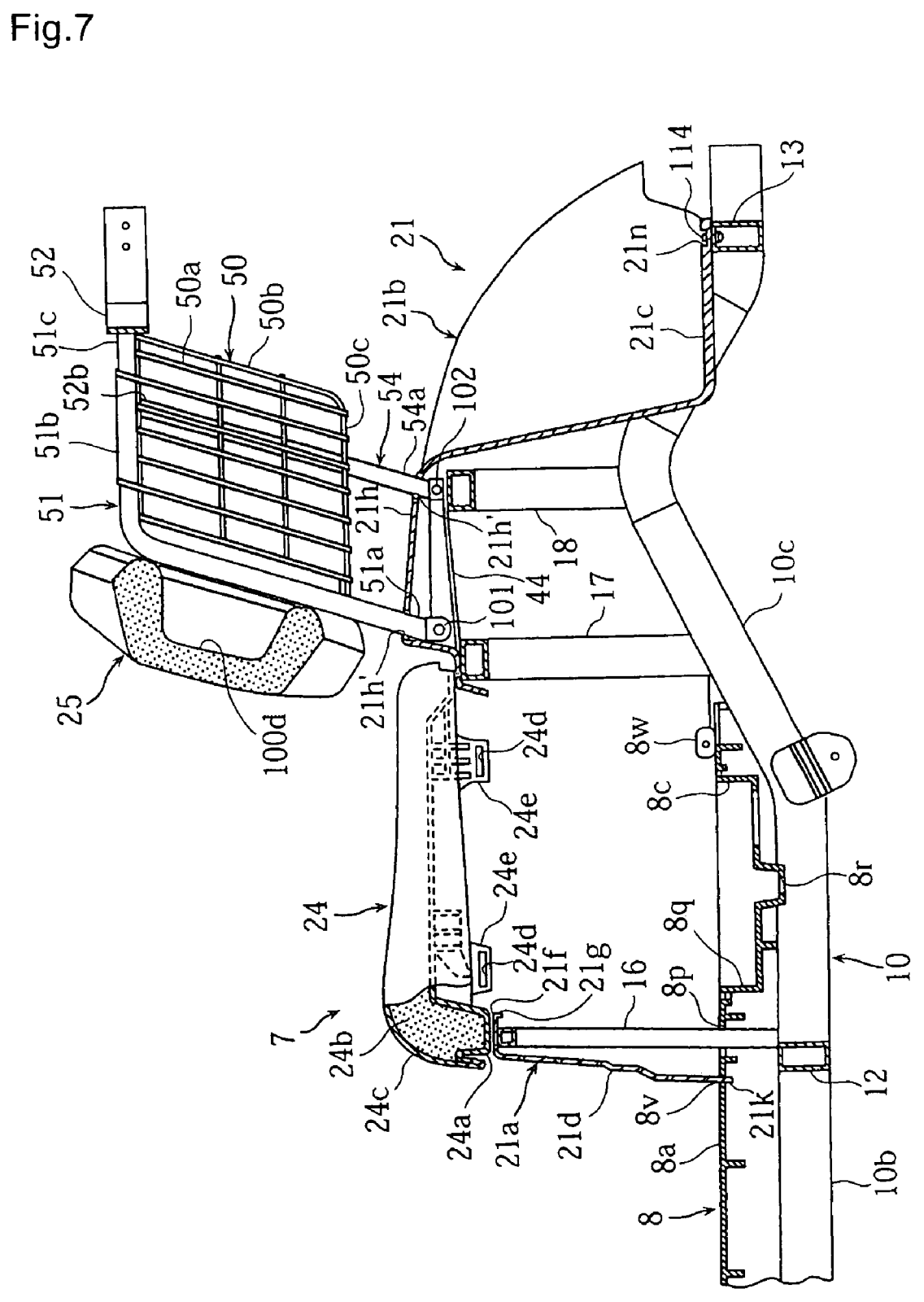

The seat cushion 24, as shown in FIG. 7, has a structure in which a cushion material 24*b* is disposed on an upper surface of a seat base plate 24*a* preferably made of resin, and a surface of the cushion material 24*b* is covered by an outer layer member 24*c*. An outer periphery of the outer layer member 24*c* is fixed to the seat base plate 24*a* by a fixture (not shown) such as a staple, for example. On the seat base plate 24*a*, armrest mounting portions 24*e* having armrest supporting holes 24*d* are formed.

On the left and right outer end portions of the seat cushion 24, armrests 26, 27 are disposed. The armrest 26 is supported in an attachable/detachable manner to the seat cushion 24, by inserting a front/rear pair of fixing pieces 26*a* provided at a lower end portion of the armrest 26 into the supporting holes 24*d* and bolting and fixing the respective fixing pieces 26*a* to the seat base plate 24*a*. The armrest 27 at the seat side has a similar structure.

Figure 10:
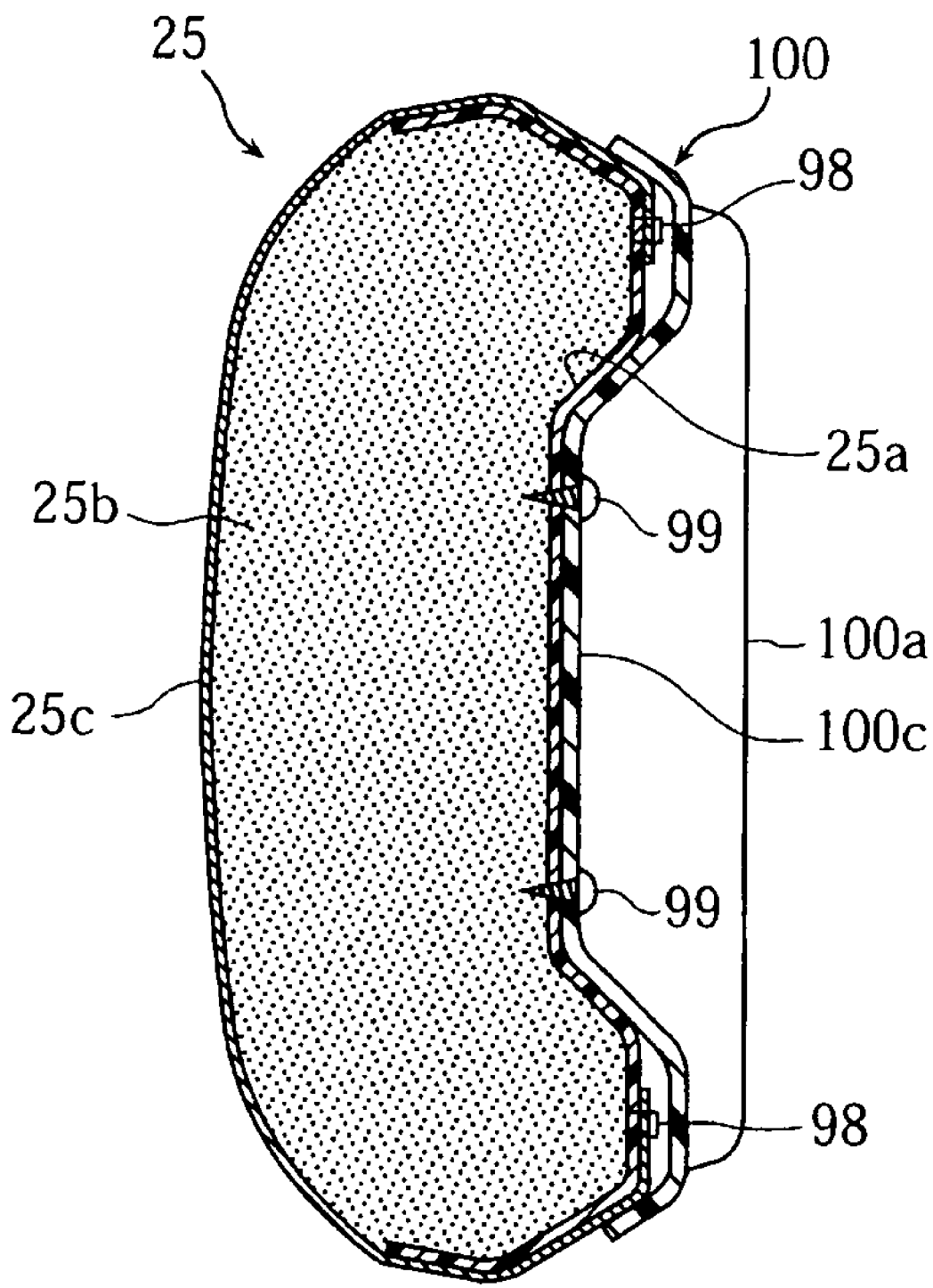
FIG. 10 is a cross-sectional view of the seat back (cross-sectional view taken along an X-X line in FIG. 9)
Figure 11:
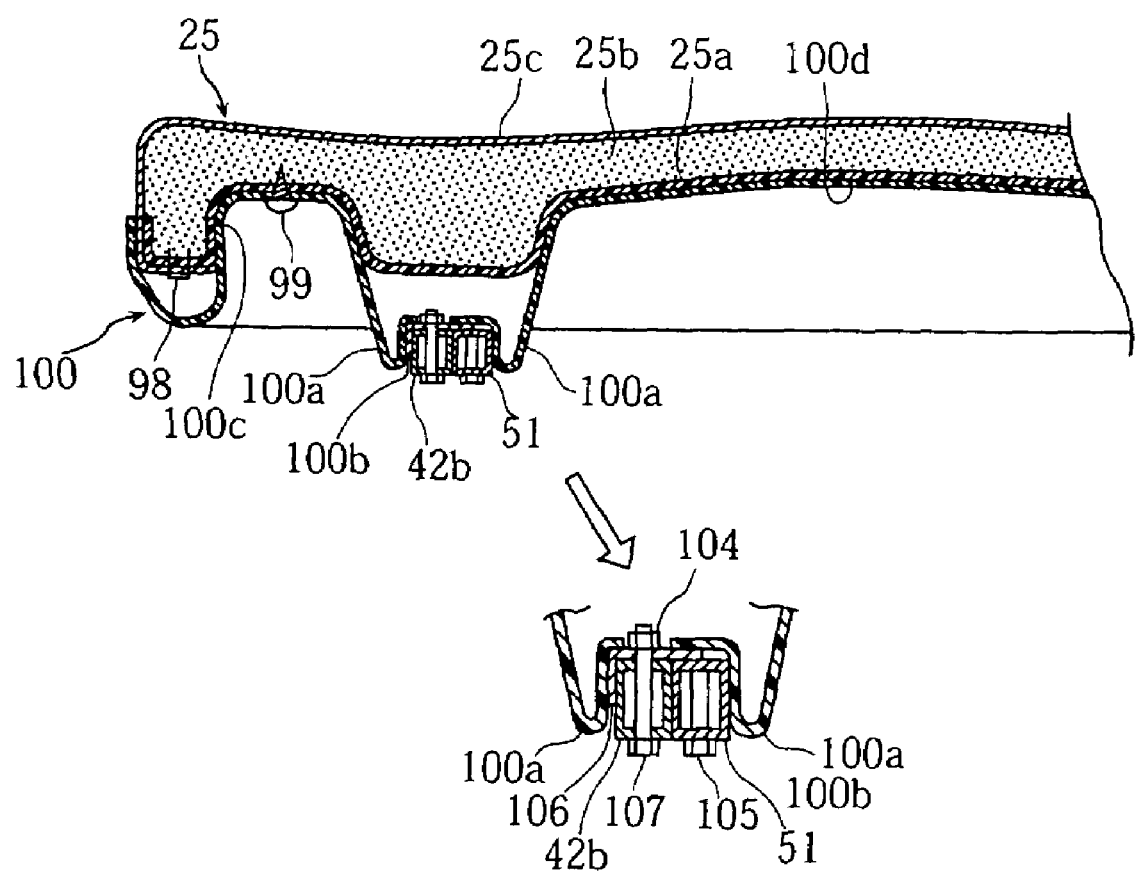
FIG. 11 is a cross-sectional view of the seat back (cross-sectional view taken along an XI-XI line in FIG. 9)

The seat back 25 is constituted, as shown in FIG. 10, mainly with a bottom plate 25*a*, a cushioning body 25*b* disposed on a front surface of the bottom plate 25*a*, the outer layer member 25*c* which covers a surface of the cushioning body 25*b* and an outer periphery of which is fixed to the bottom plate 25*a* by numerous fixtures 98, such as staples, for example, and a cover plate 100 covering an entire rear surface of the bottom plate 25*a*, as well as covering the fixtures 98 of the outer layer member 25*c*. Incidentally, the cover plate 100 can be arranged in such a manner to cover only portions of the outer layer member 25*c* which are fixed to the bottom plate 25*a*.

The cover plate 100 is preferably formed from a fiber reinforced resin, on an outer surface (rear surface) of which a surface treatment such as coloring, design, logos, etc. is preferably applied to enhance a design effect. The cover plate 100 is fastened and fixed to the bottom plate 25*a* at appropriate locations, for example, by tapping screws 99 screwed to left and right recess portions 100*c*. Incidentally, the cover plate 100 and the bottom plate 25*a* can be fixed to each other by an adhesive or other suitable means.

On left and right side portions of the cover plate 100, left/right pairs of ribs 100*a* extending in the vertical direction are arranged in such a manner to protrude rearward. A portion sandwiched by the left and right ribs 100*a* is a positioning recess portion 100*b*.

Inside the positioning recess portion 100*b*, there are disposed substantially in parallel an upper portion of the seat back supporting member (support post for holding seat back) 51 preferably made of a substantially rectangular pipe fixed to the vehicle body frame and extending in the vertical direction, and the lower end portion 42*b* of the rear roof pillar (support post for holding the roof) 42 preferably made of substantially rectangular pipe. As a result of this arrangement, movement of the seat back supporting member 51 and the rear roof pillar 42 in the vehicle width direction and in a forward direction is restrained.

On a portion of the positioning recess portion 100*b* on which the seat back supporting member 51 abuts, an upper/lower pair of nuts 103 are disposed by insert molding. To these nuts 103, bolts 105 inserted to the seat back supporting member 51 from a rearward position are screwed, and thus, the cover plate 25*a* of the seat back 25 is fixed to the supporting member 51.

Additionally, to the seat back supporting member 51, substantially L-shaped roof brackets 106 are fixed with bottoms thereof facing rearward. Further, on front surfaces of the roof brackets 106, an upper/lower pair of nuts 104 are fixed (see FIG. 11, FIG. 16). To the nuts 104, bolts 107 inserted from a rearward position to the lower end portion 42b of the rear roof pillar 42 are screwed. As a result, the rear roof pillar 42 is fixed to the seat back supporting member 51 via the roof brackets 106, and consequently supported by the vehicle body frame.

The left and right seat back supporting members 51 are supported by the vehicle body frame 2 as described above, and more specifically, the left and right seat back supporting members 51 preferably have the following structure.

Figure 3:
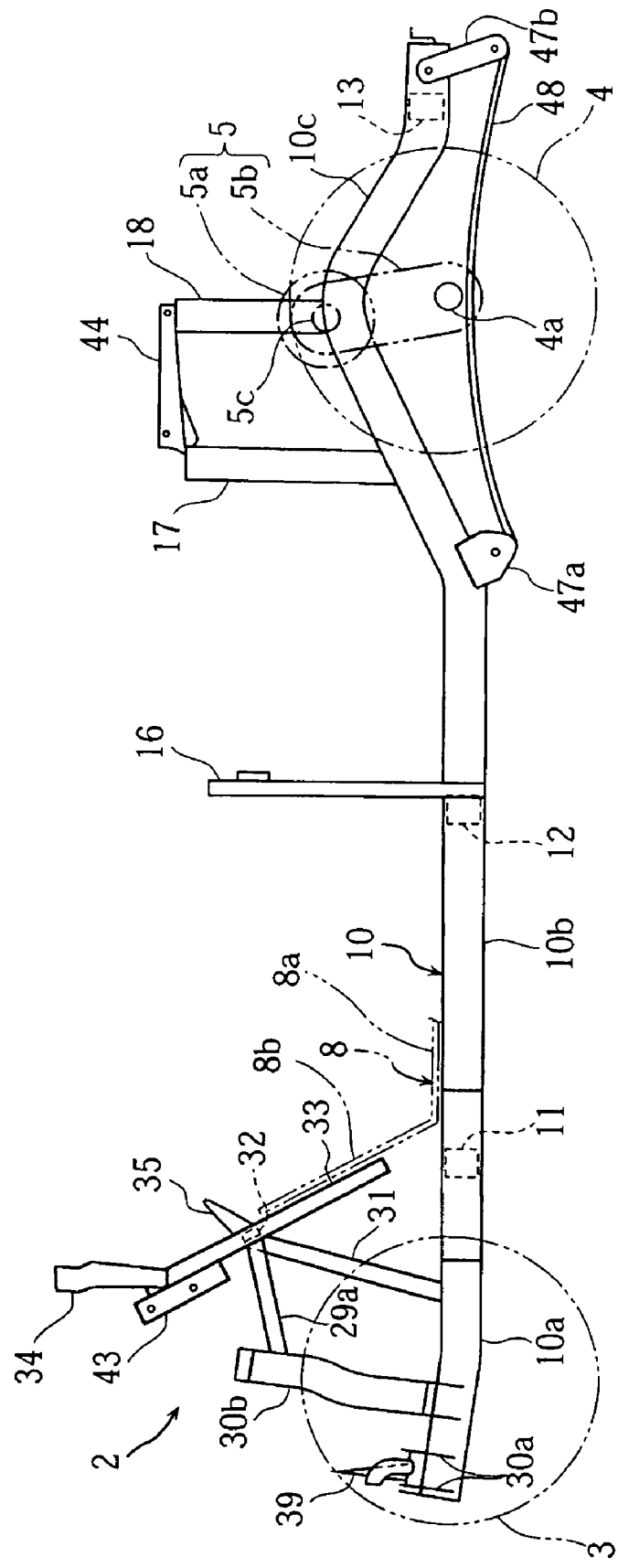
FIG. 3 is a left side view of the vehicle body frame.
Figure 4:
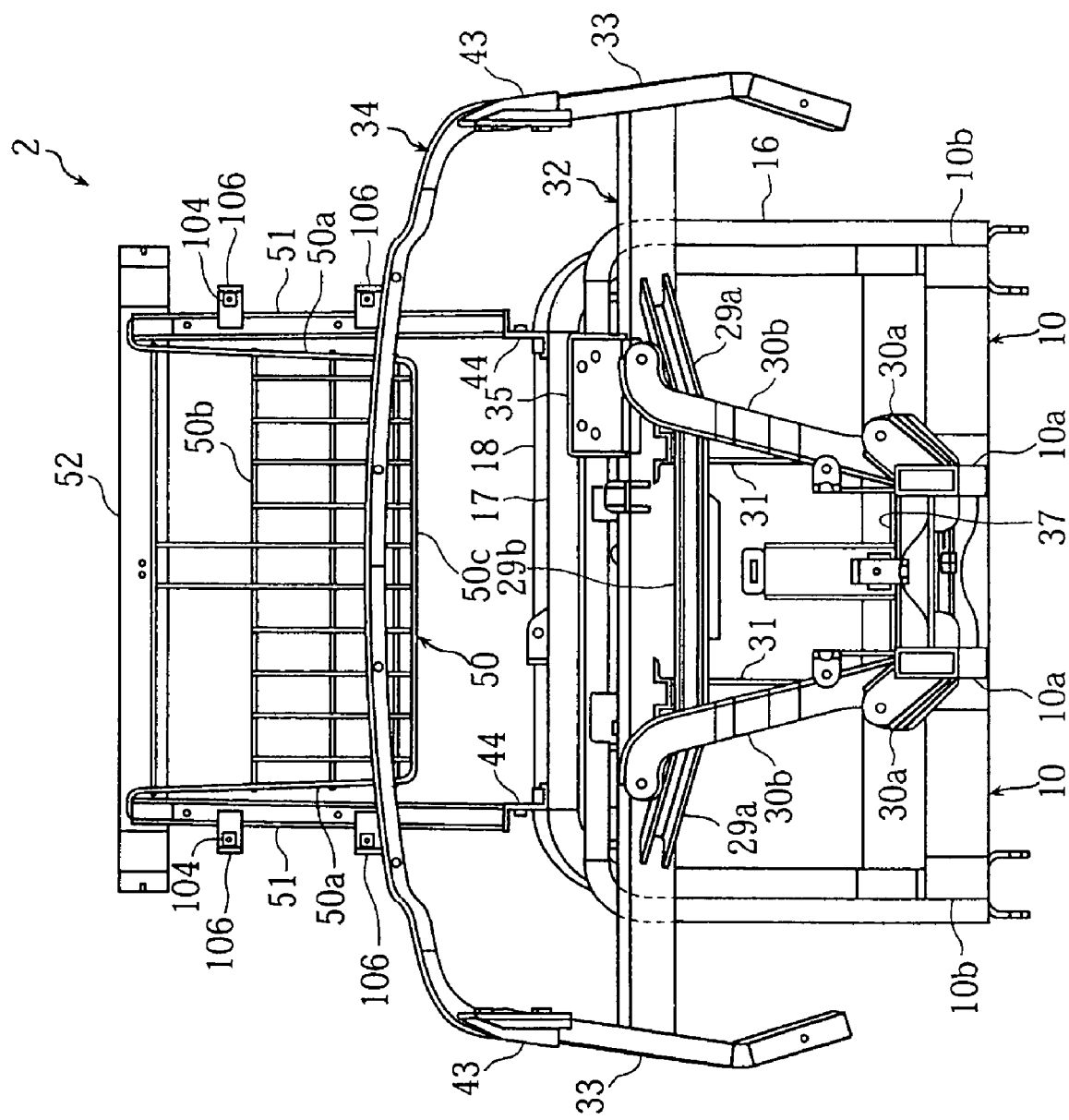
FIG. 4 is a front view of the vehicle body frame.

On upper surfaces of the front-side and rear-side rear cross frames 17, 18, left and right sheet metal brackets 44 extending in the longitudinal direction are joined so as to bridge the cross frames 17, 18, as seen in FIG. 3. On front end portions of the left and right brackets 44, the lower end portions 51a of the left and right seat back supporting members 51 are fixed by bolts 101. Additionally, on rear end portions of the brackets 44, lower end portions 54a of left and right storage area support posts (second support posts) 54 extending in the vertical direction substantially in a substantially parallel manner relative to the seat back supporting members 51 are fixed by bolts 102.

Figure 6:
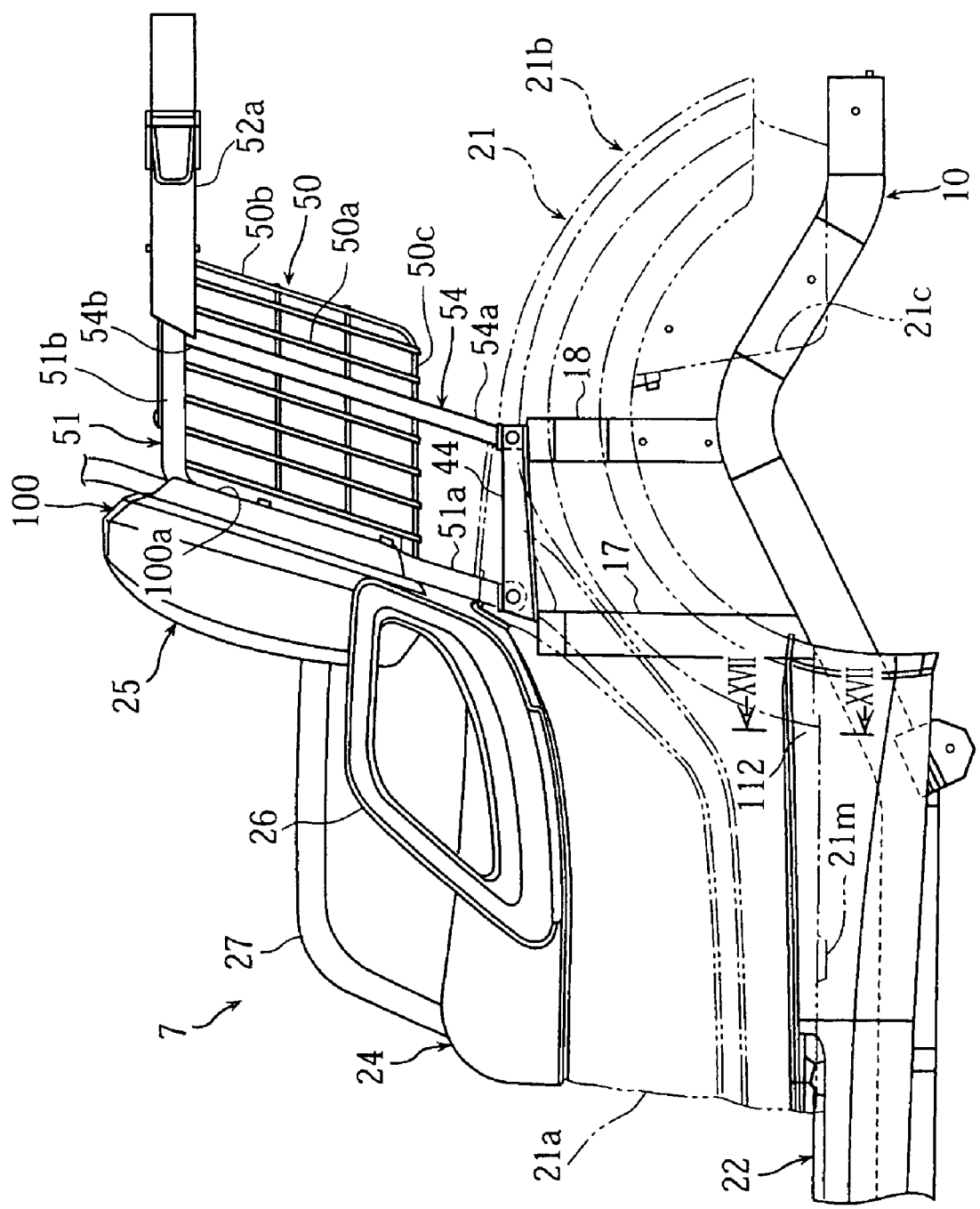
FIG. 6 is a left side view of the seat unit mounted on the vehicle body frame.
Figure 8:
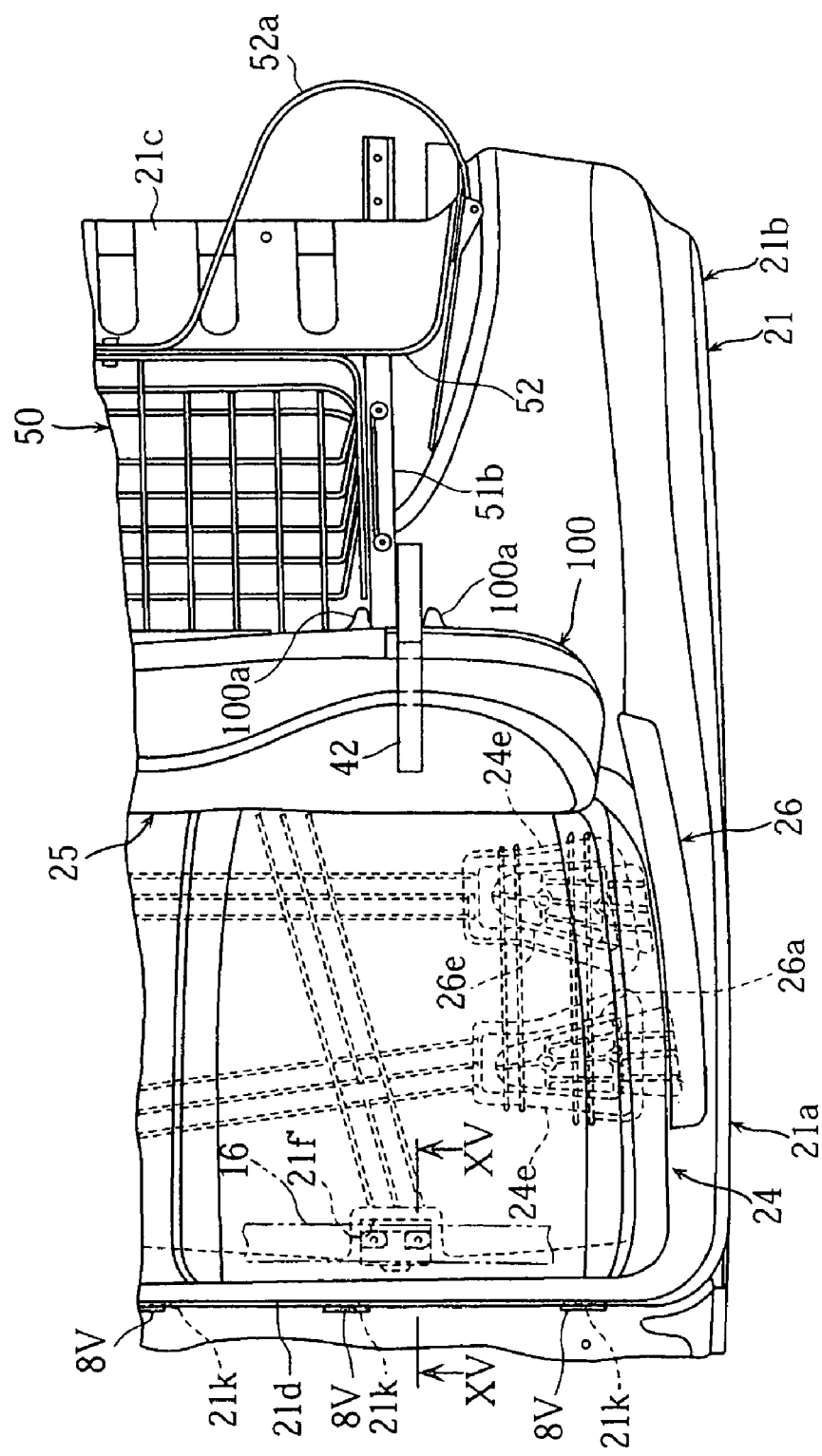
FIG. 8 is a plan view of the seat unit.
Figure 9:
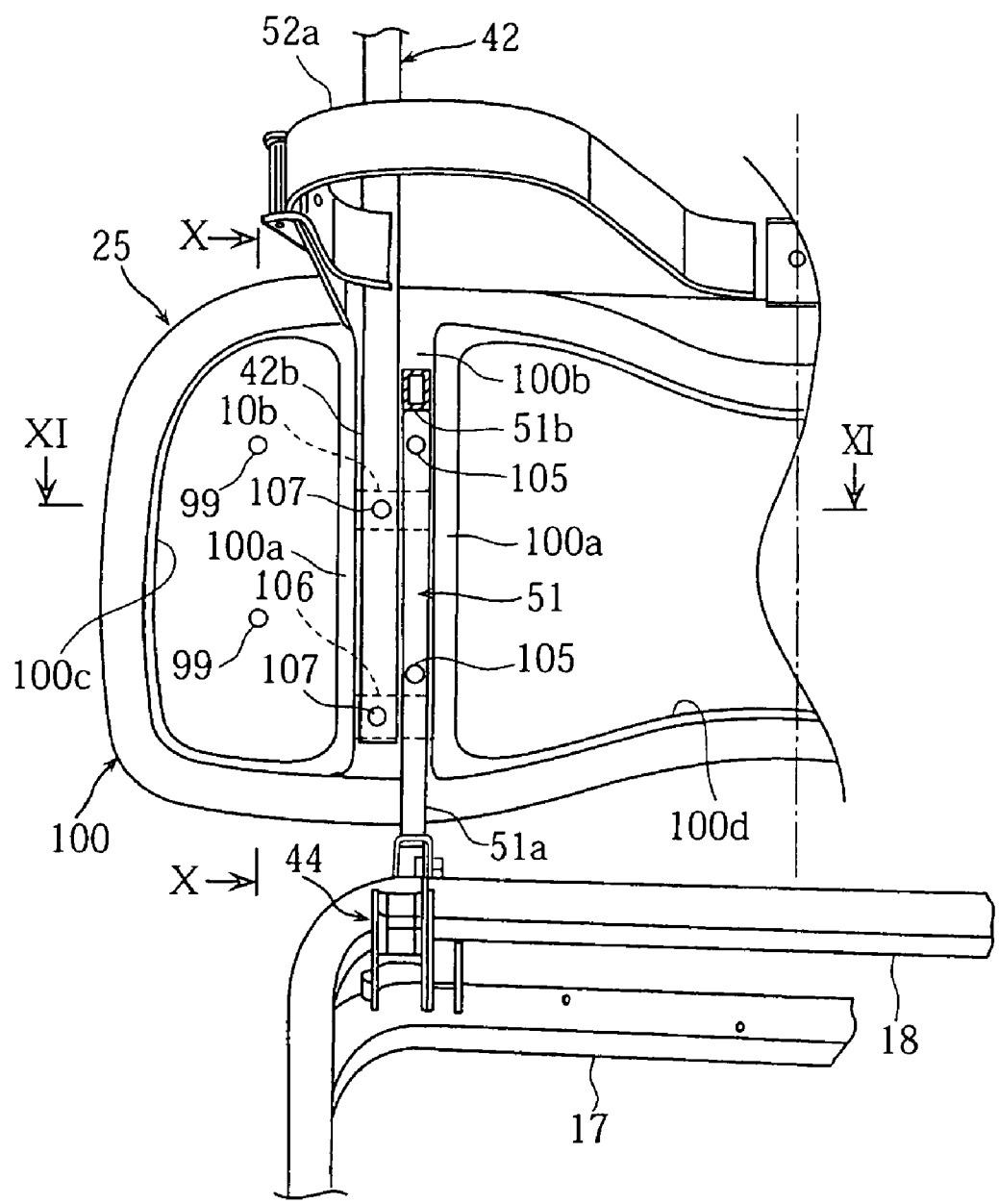
FIG. 9 is a rear view of a seat back of the seat unit.

The left and right seat back supporting members 51 extend rearward from an area of the upper end portion of the seat back 25 in a bending manner, and the extended portions (longitudinally extending portions) 51b are connected to the upper end portions 54b of the storage area support post 54 as seen in FIG. 6. Viewed from the sides of the vehicle, a left/right pair of quadrangular supporting members are formed with the seat back supporting members 51, the extended portions 51b, the brackets 44, and the storage area support posts 54. As a result of this construction, supporting stiffness of the seat back 25 and supporting stiffness of the left and right rear roof pillars 42 are enhanced.

Additionally, to back end portions 51c of the left and right extended portions 51b, there is joined a band plate-shaped bag carrier (transverse member) 52 extending in the vehicle width direction, to prevent upper ends of the left and right storage area support posts 54 from transforming toward an opening direction or toward a closing direction in the horizontal direction. To the bag carrier 52, a fastener 52a for anchoring a golf bag thereto is attached. More specifically, the left quadrangular supporting member and right quadrangular supporting member are joined by the transverse member (bag carrier), enhancing the stiffness as a whole.

Between the left and right seat back supporting members 51, there is disposed a box-shaped bucket 50 preferably formed of numeral bars assembled into a lattice configuration. The bucket 50 includes left and right side wall portions 50a extending from the left and right extended portions 51b, a rear wall portion 50b extending from the bag carrier 52, and a bottom wall portion 50c provided among the lower end portions of the rear wall portion 50b and the left and right side wall portions 50a. The bucket 50 and the cover plate 100 of the seat back 25 define a storage area which opens upward.

In a portion of the cover plate 100 which corresponds to the bucket 50, a recess portion 100d arranged to be forwardly recessed is provided. The recess portion 100d is arranged to extend between the left and right inner ribs 100a. The recess portion 100d increases the capacity of the storage area formed with this bucket 50 and the cover plate 100.

The vehicle body cover 9 includes the front cover 20 covering the front portion of the vehicle body frame 2, the rear cover 21 covering the rear portion, and side covers 22 covering portions between the front cover 20 and the rear cover 21.

The front cover 20 includes a front cowl 56 covering above the left and right front wheels 3, and a dashboard 57 covering a rear surface of the front cowl 56. This dashboard 57 has a protruding portion 61 protruding rearward from a central portion along the vehicle width direction. On a rear end surface of this protruding portion 61, there is arranged a main switch 64, while on an upper surface portion there are preferably provided a plurality of cup holders (not shown) which allow putting/taking out cups, plastic bottles and the like from above while sitting on the seat.

The rear cover 21 has a structure in which a seat cover portion 21a is arranged to surround a lower side of the seat cushion 24, and a rear cowl portion 21b extends rearward from the seat cover portion 21a and covers above the left and right rear wheels 4. The seat cover portion 21a and the rear cowl portion 21b are preferably integrally formed of resin, for example.

The seat cover portion 21a has a front wall portion 21d covering a front of the seat cushion 24, side wall portions 21e covering left and right sides of the seat cushion 24, and a top wall portion 21f provided at upper end portions of the left and right side wall portions 21e and the front wall portion 21d.

On a portion of this top wall portion 21f which fronts the seat base plate 24a of the seat cushion 24, a seat opening 21g is formed. A front edge portion of the top wall portion 21f is mounted on an upper surface of the seat cross frame 16, while a rear edge portion is mounted on an upper surface of the front-side rear cross frame 17.

The rear cowl portion 21b has a rear cowl portion 21h extending continuously from the top wall portion 21f and extending rearward and downward in a bending manner, rear fender portions 21i extending continuously from the left and right side wall portions 21e and covering the area above the left and right rear wheels 4, and a golf bag rack 21c formed in a recessed manner on the rear cowl portion 21b between the left and right rear wheels 4.

On the rear cowl portion 21h, there are formed holes 21h' through which the left and right seat back supporting members 51 and the left and right storage area support posts 54 are inserted (see FIG. 7). In the respective holes 21h', there are attached grommets 110 (FIG. 12), to block in spaces around the supporting members 51 and the storage area support posts 54.

Figure 13:
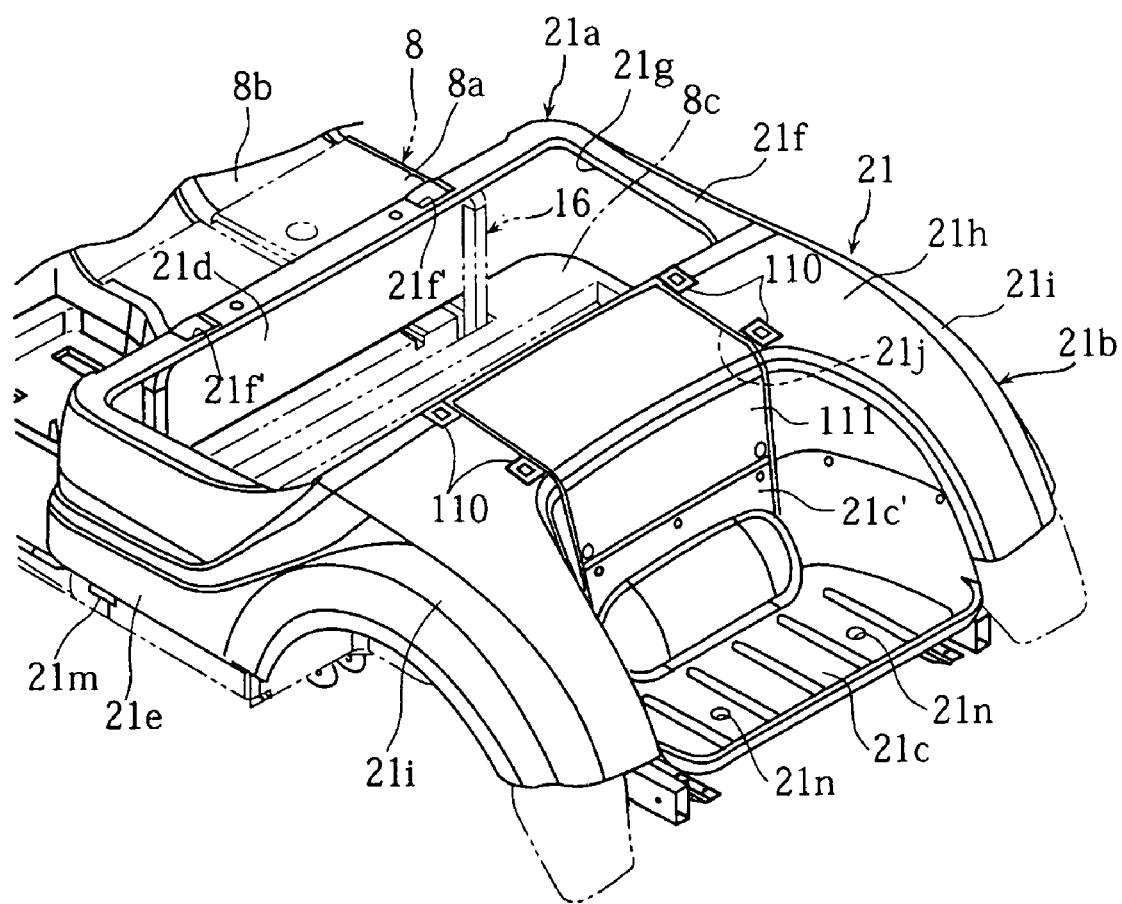
FIG. 13 is a perspective view of the rear cover.
Figure 14:
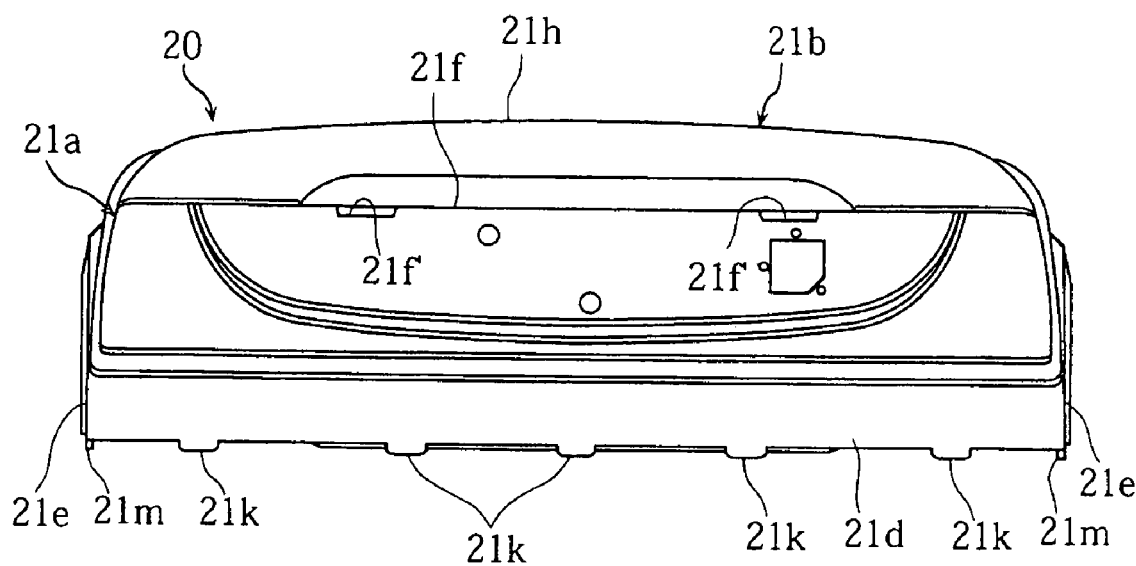
FIG. 14 is a front view of the rear cover.
Figure 15:
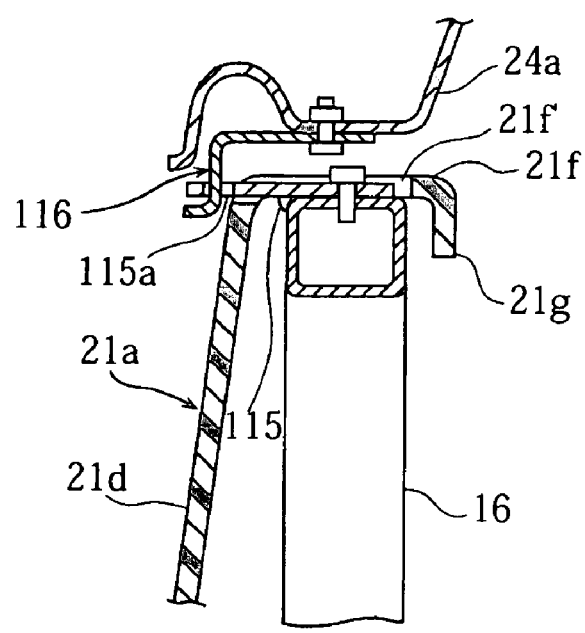
FIG. 15 is a cross-sectional side view of a hinge portion of the seat unit (cross-sectional view taken along an XV-XV line in FIG. 8)
Figure 16:
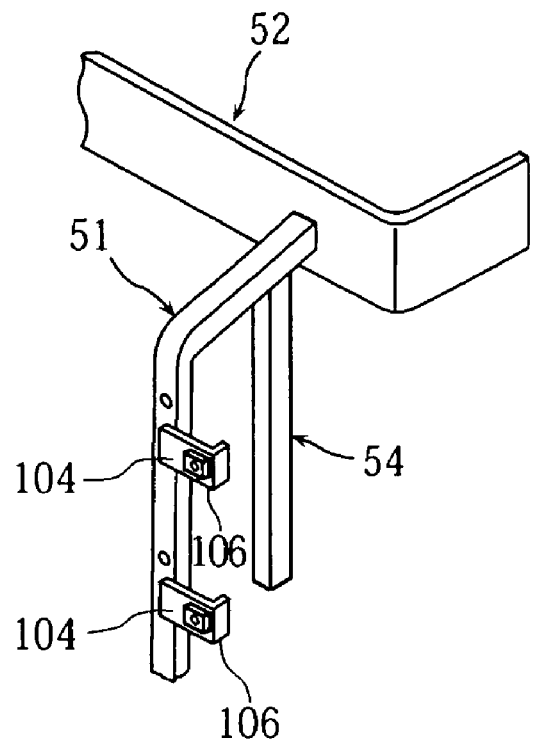
FIG. 16 is a perspective view of a support post of the vehicle body frame.
Figure 17:
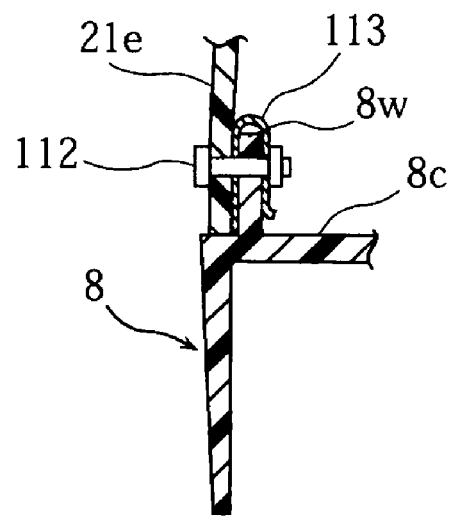
FIG. 17 is a cross-sectional view of a portion of the rear cover which is fixed to the frame (cross-sectional view taken along an XVII-XVII line in FIG. 6).

Additionally, in the rear cowl portion 21h, there is formed a maintenance opening 21j which is as large as an area extending from the rear cowl portion 21h to a vertical wall 21c' of the golf bag rack 21c, and the maintenance opening 21j is arranged to be openable/closable by a cover plate 111 (FIG. 13). By detaching this cover plate 111, there can be carried out mounting and fixing of the lower ends of the seat back supporting members 51 and the lower ends of the storage area support posts 54 to the brackets 44 by bolts, as well as checkup and maintenance of the power unit 5, electric components (not shown) and the like.

The rear cover 21 is mounted on the vehicle body frame 2 according to the following schematic structure. Specifically, engagement portions to be engaged are formed on the foot panel portion of the floor panel on which the occupant's feet are placed, while engaging pieces which are engageable/disengageable to the engagement portion to be engaged are formed on the front end portion of the rear cover, and the rear cover is mounted on the vehicle body by engaging the engaging pieces to the engagement portions to be engaged of the floor panel as well as fixing adjacent portions of the seat to the vehicle body frame.

The structure for mounting the rear cover 21 on the vehicle body frame will be described more specifically. On a lower edge of the front wall portion 21d of the seat cover portion 21a, a plurality (e.g., five) of engaging pieces 21k are arranged to protrude downward at predetermined intervals along the vehicle width direction. Additionally, on lower edges of the left and right side wall portions 21e, engaging pieces 21m are arranged to protrude downward (see FIG. 14). Further, on portions of the golf bag rack 21c which front an upper surface of the rear cross pipe 13, a left/right pair of attachment seats 21n are arranged in a recessed manner.

On a front side portion of the opening 8p of the foot panel portion 8a of the floor panel 8, there are formed a plurality of engaging holes (engagement portions to be engaged) 8v to which the respective engaging pieces 21k are engageable/disengageable. Additionally, on left and right rear end portions of the battery mounting portion 8c of the floor panel 8, there are provided fixing portions 8w abutting on inner side surfaces of the left and right side wall portions 21e. Further, on the side covers 22, there are formed engaging holes (not shown) to which the left and right engaging pieces 21m are engageable/disengageable.

Figure 12:
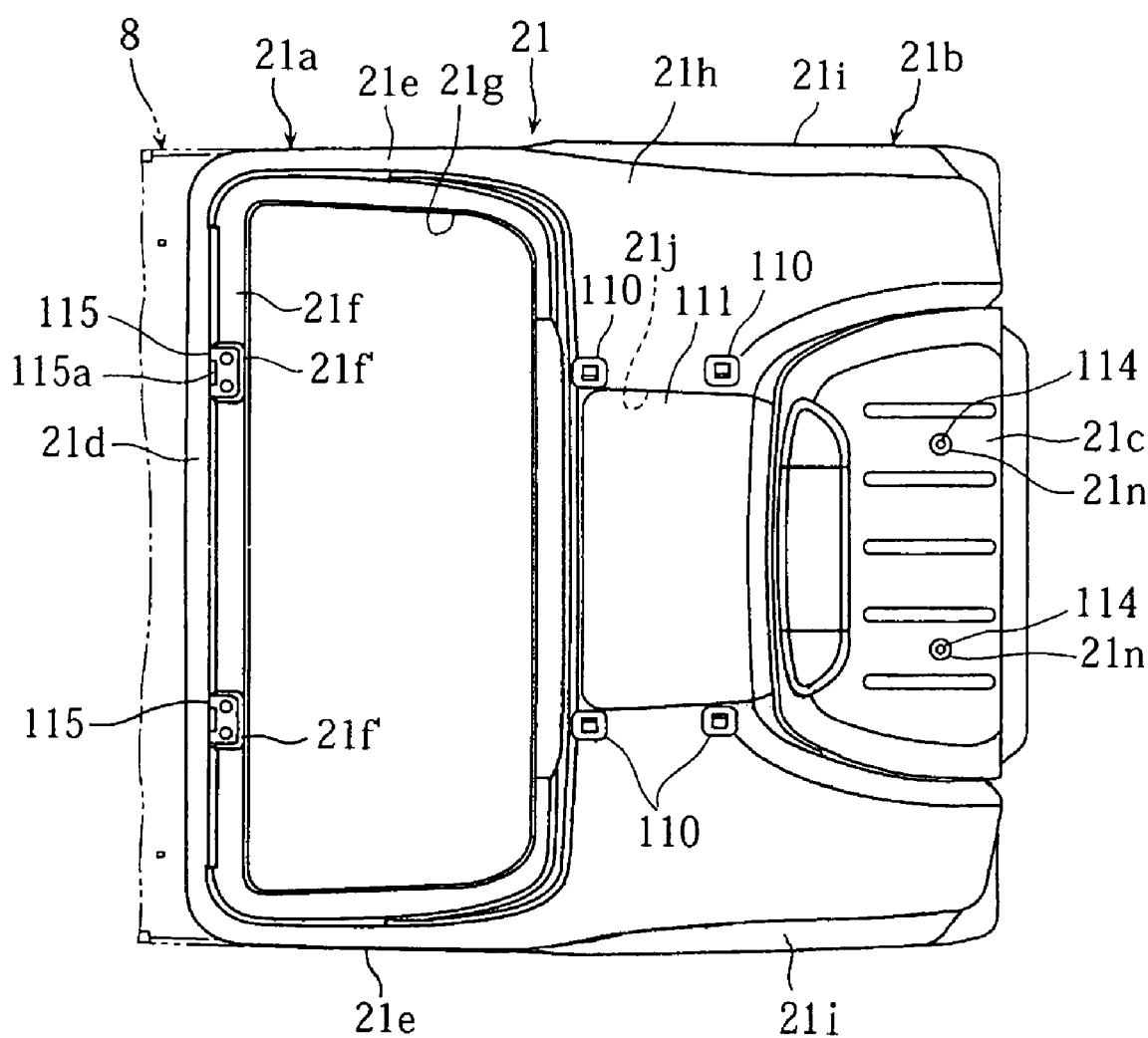
FIG. 12 is a plan view of a rear cover of the vehicle body frame.

Thus, the rear cover 21 is fixed to the floor panel 8 and the vehicle body frame 2. More specifically, the respective engaging pieces 21k of the seat cover portion 21a are inserted into the respective engaging holes 8v of the floor panel 8, and the left and right engaging pieces 21m are inserted into the engaging holes of the side covers 22. In this state, the left and right side wall portions 21e are fixed to the fixing portions 8w by fasteners 112 via U-shaped leaf springs 113 (FIG. 17), and the left and right attachment seats 21n are fixed to the rear cross pipe 13 by bolts 114 (FIG. 12).

The seat cushion 24 is mounted on the vehicle body frame according to the following schematic structure. More specifically, seat supporting frames (seat cross frame 16, front-side rear cross frame 17) are arranged in such a manner to extend upward from the vehicle body frame 2, the upper surfaces of the seat supporting frames are covered by a portion of the rear cover 21 which corresponds to the seat, and the seat cushion 24 is mounted on an upper surface of the rear cover 21 which corresponds to the seat and is structured such that a load is transmitted to the seat supporting frames via the portion corresponding to the seat. Additionally, on the upper surfaces of the seat supporting frames, frame side brackets 115 are provided, and to the frame side brackets 115, seat side brackets 116 provided on the seat cushion 24 are engaged such that the seat cushion 24 is pivotal and attachable/detachable. Furthermore, the frame side brackets 115 are disposed in a portion of the rear cowl 21 which corresponds to the seat, and are fixed to cut-out portions to expose the seat supporting frame (seat cross frame 16).

The structure for mounting the seat cushion 24 will be described more specifically. The top wall portion 21f of the seat cover portion 21a which is positioned below the seat cushion 24 covers upper surfaces of the seat cross frame 16 and the front-side rear cross frame 17. Additionally, an outer periphery of the seat base plate 24a of the seat cushion 24 is mounted on the top wall portion 21f. By this structure, the load applied by the occupant and the like to the seat cushion 24 is transmitted to the seat cross frame 16 and front-side rear cross frame 17 via the top wall portion 21f.

Additionally, on the front side of the top wall portion 21f, a left/right pair of substantially rectangular cut-out portions 21f' are formed. Through these cut-out portions 21f', the upper surface of the seat cross frame 16 is exposed.

On the upper surface of the seat cross frame 16 inside the cut-out portions 21f', plates (frame side brackets) 115 having hook holes 115a are bolted and fixed. Additionally, on portions of the seat base plate 24a which correspond to the left and right plates 115, hook members (seat side brackets) 116 that are engageable/disengageable with the hook holes 115a are bolted and fixed. Accordingly, the seat cushion 24 is mounted pivotally and attachably/detachably by engaging the hook portions 116 to the hook holes 115a of the plates 115.

In the present preferred embodiment, since portions of the bottom plate 25a of the seat back 25 to which the outer periphery of the outer layer member 25c is fixed by fixtures 98 are covered by the cover plate 100, the rear surface of the seat back 25 can be prevented from looking unattractive. Additionally, by applying the surface treatment on the cover plate 100 to enhance the design effect, the appearance can be further improved.

Since the lower end portion 42b of the rear roof pillar 42 is fixed to the seat back supporting member 51 to which the seat back 25 is fixed and supported, the rear roof pillar 42 can be supported by using the seat back supporting member 51, and the structure thereof is simpler compared with the structure in which both the seat back supporting member 51 and the rear roof pillar 42 are individually fixed to the vehicle body frame, so that a component cost and an assembly cost can be reduced.

Further, since the pair of ribs 100a extending in the vertical direction are formed on the rear surface of the cover plate 100 and the seat back supporting member 51 and the rear roof pillar 42 are arranged in a substantially parallel configuration between both ribs 100a, the seat back 25 can be easily and securely positioned in the vehicle width direction and the longitudinal direction, so that the seat back 25 can be accurately and easily mounted.

Furthermore, since the left/right pair of storage area support posts 54 are provided behind the left and right seat back supporting members 51 and the left and right storage area support posts 54 and the seat back supporting members 51 are joined to each other by the extended portions 51b, and since the left and right storage area support posts are joined to each other by the bag carrier 52, the supporting stiffness of the seat back 25 and the supporting stiffness of the rear roof pillar 42 is greatly increased.

Additionally, since the storage area which is open upward is defined by the left and right side wall portions 50a extending from the extended portion 51b of the left and right supporting members 51, the rear wall portion 50b extending from the bag carrier 52, the bottom wall portion 50c provided among the lower edges of the rear wall portion 50b and the left and right side wall portions 50a, and the cover plate 100, the storage area can be defined by effectively using the empty space behind the seat back 25.

Since the storage recess portion 100d recessing forward is formed on the portion of the cover plate 100 which corresponds to the bucket 50, a storage volume capacity can be increased without enlarging a size of the bucket 50.

Further, in the present preferred embodiment, since, with regard to the rear cover 21, the engaging pieces 21k of the front side thereof are inserted into the engaging holes 8v of the floor panel 8 and the golf bag rack 21c of the rear side thereof is bolted and fixed to the rear cross pipe 13 of the vehicle frame 2, the number of steps for mounting the rear cover 21 can be reduced.

Additionally, since the cut-out portions 21f' are formed on the top wall portion 21f of the rear cover 21 to expose the seat cross frame 16 upward and the plates 115 are disposed and fixed on the seat cross frame 16 inside the cut-out portions 21f', the seat cushion 24 is prevented from interfering with the rear cover 21 when the seat cushion 24 is opened/closed.

In the present preferred embodiment, since the load applied to the seat cushion 24 is to be transmitted to the seat cross frame 16 via the top wall portion 21f of the rear cover 21, the load can be borne by the seat cross frame 16 that has high stiffness, so that damage and the like to the rear cover 21 can be prevented.

Further, since the seat cushion 24 is engaged to the seat cross frame 16 in a pivotal and attachable/detachable manner via the plates 115 and the hook portions 116, checkup and maintenance of the battery unit disposed below the cushion 24 can be easily carried out only by opening or detaching the seat cushion 24.

The present invention may be embodied in other specific forms without departing from the spirit or essential characteristics thereof.

The present preferred embodiments are therefore to be considered in all respects as illustrative and non-restrictive, the scope of the invention being indicated by the appended claims rather than by the foregoing description, and all changes which fall within the meaning and range of equivalency of the claims are therefore intended to be embraced therein.

What is claimed is:

1. A seat unit for a small-sized vehicle comprising:
   a seat cushion mounted on a vehicle body frame;
   a seat back arranged to extend upwardly from a rear edge of said seat cushion, said seat back includes a bottom plate, a cushioning body disposed on a front surface of said bottom plate, an outer layer member arranged to cover said cushioning body and has an outer periphery that is fixed to said bottom plate, and a cover plate fixed to an outer periphery of said bottom plate and covering a portion of said outer layer member which is fixed to said bottom plate; and
   a first support post and a second support post, wherein a rear surface of said cover plate of said seat back is fixed to said first support post and arranged to hold said seat back extending in a vertical direction, and said second support post is arranged to hold a roof extending in the vertical direction and abut a vertically extending portion of said first support post and is fixed to the vertically extending portion of said first support post.

2. The seat unit for the small-sized vehicle according to claim 1, wherein a pair of ribs extending in the vertical direction are provided on the rear surface of said cover plate of said seat back, and said first and second support posts are disposed substantially parallel to each other between said pair of ribs.

3. The seat unit for the small-sized vehicle according to claim 1, wherein the first support post includes left and right first support posts, and further comprising left and right storage support posts joined and fixed to the vehicle body frame provided behind the left and right first support posts, the left first and storage support posts being joined to each other and the right first and storage support posts being joined to each other by left and right longitudinal members to define a left support post member and a right support post member, respectively, and the left support post member and the right support post member being joined to each other by a transverse member.

4. The seat unit for the small-sized vehicle according to claim 3, wherein a storage area open upward is defined by left and right side walls extending from the left and right longitudinal members, a rear wall extending from the transverse member, a bottom wall provided at lower end portions of the rear wall and the side walls, and said cover plate of said seat back.

5. The seat unit for the small-sized vehicle according to claim 4, wherein a recess portion arranged to be recessed in a forward direction is formed in a portion of said cover plate which corresponds to the storage area.

* * * * *